(12) United States Patent
Rozas et al.

(10) Patent No.: US 9,875,105 B2
(45) Date of Patent: Jan. 23, 2018

(54) CHECKPOINTED BUFFER FOR RE-ENTRY FROM RUNAHEAD

(75) Inventors: Guillermo J. Rozas, Los Gatos, CA (US); Paul Serris, San Jose, CA (US); Brad Hoyt, Portland, OR (US); Sridharan Ramakrishnan, Hillsboro, OR (US); Hens Vanderschoot, Tigard, OR (US); Ross Segelken, Portland, OR (US); Darrell Boggs, Aloha, OR (US); Magnus Ekman, Alameda, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 876 days.

(21) Appl. No.: 13/463,627

(22) Filed: May 3, 2012

(65) Prior Publication Data

US 2013/0297911 A1    Nov. 7, 2013

(51) Int. Cl.
*G06F 9/38*    (2006.01)

(52) U.S. Cl.
CPC .......... *G06F 9/3802* (2013.01); *G06F 9/3814* (2013.01); *G06F 9/3863* (2013.01)

(58) Field of Classification Search
CPC ...................................................... G06F 9/461
USPC ........................................................ 712/214
See application file for complete search history.

(56) References Cited

U.S. PATENT DOCUMENTS

| 5,487,146 A | 1/1996 | Guttag et al. |
| 5,721,855 A | 2/1998 | Hinton et al. |
| 5,864,692 A | 1/1999 | Faraboschi |
| 5,870,582 A * | 2/1999 | Cheong et al. ............... 712/218 |
| 5,956,753 A | 9/1999 | Glew et al. |
| 6,037,946 A | 3/2000 | Takeda |

(Continued)

FOREIGN PATENT DOCUMENTS

| CN | 1519728 | 8/2004 |
| CN | 1629799 | 6/2005 |

(Continued)

OTHER PUBLICATIONS

Dundas, James and Trevor Mudge., Improving Data Cache Performance by Pre-Executing Instructions Under a Cache Miss. Proc. 1999 ACM Int. Conf. on Supercomputing, Jul. 1997, Dept. of Electrical Engineering and Computer Science, University of Michigan, 9 pages.

(Continued)

*Primary Examiner* — Andrew Caldwell
*Assistant Examiner* — Michael Metzger (57) ABSTRACT

Embodiments related to re-dispatching an instruction selected for re-execution from a buffer upon a microprocessor re-entering a particular execution location after runahead are provided. In one example, a microprocessor is provided. The example microprocessor includes fetch logic, one or more execution mechanisms for executing a retrieved instruction provided by the fetch logic, and scheduler logic for scheduling the retrieved instruction for execution. The example scheduler logic includes a buffer for storing the retrieved instruction and one or more additional instructions, the scheduler logic being configured, upon the microprocessor re-entering at a particular execution location after runahead, to re-dispatch, from the buffer, an instruction that has been previously dispatched to one of the execution mechanisms.

18 Claims, 5 Drawing Sheets

(56) References Cited

U.S. PATENT DOCUMENTS

| | | |
|---|---|---|
| 6,484,254 B1 | 11/2002 | Chowdhury |
| 6,519,694 B2 | 2/2003 | Harris |
| 6,665,792 B1 | 12/2003 | Merchant |
| 7,010,648 B2 | 3/2006 | Kadambi et al. |
| 7,062,631 B1 | 6/2006 | Klaiber et al. |
| 7,117,330 B1 | 10/2006 | Alverson et al. |
| 7,194,604 B2 | 3/2007 | Bigelow et al. |
| 7,293,161 B1 | 11/2007 | Chaudhry |
| 7,421,567 B2 * | 9/2008 | Eickemeyer .......... G06F 9/3804 712/216 |
| 7,587,584 B2 | 9/2009 | Enright |
| 7,752,627 B2 * | 7/2010 | Jones et al. .................... 718/105 |
| 7,873,793 B1 | 1/2011 | Rozas et al. |
| 7,890,735 B2 * | 2/2011 | Tran .............................. 712/215 |
| 8,035,648 B1 | 10/2011 | Wloka et al. |
| 8,707,011 B1 | 4/2014 | Glasco et al. |
| 9,582,280 B2 | 2/2017 | Kumar |
| 9,632,976 B2 | 4/2017 | Rozas et al. |
| 2003/0018685 A1* | 1/2003 | Kalafatis et al. ............. 709/102 |
| 2003/0196010 A1 | 10/2003 | Forin et al. |
| 2004/0128448 A1* | 7/2004 | Stark et al. ................... 711/137 |
| 2005/0041031 A1 | 2/2005 | Diard |
| 2005/0055533 A1 | 3/2005 | Kadambi et al. |
| 2005/0138332 A1* | 6/2005 | Kottapalli et al. ............ 712/218 |
| 2005/0154831 A1 | 7/2005 | Steely et al. |
| 2006/0010309 A1* | 1/2006 | Chaudhry et al. ........... 712/235 |
| 2006/0095678 A1 | 5/2006 | Bigelow et al. |
| 2006/0149931 A1* | 7/2006 | Haitham et al. ............. 712/218 |
| 2006/0174228 A1 | 8/2006 | Radhakrishnan et al. |
| 2006/0179279 A1 | 8/2006 | Jones et al. |
| 2006/0212688 A1 | 9/2006 | Chaudhry et al. |
| 2006/0277398 A1 | 12/2006 | Akkary et al. |
| 2007/0074006 A1 | 3/2007 | Martinez et al. |
| 2007/0174555 A1 | 7/2007 | Burtscher et al. |
| 2007/0186081 A1 | 8/2007 | Chaudhry et al. |
| 2007/0204137 A1 | 8/2007 | Tran |
| 2009/0019317 A1 | 1/2009 | Quach et al. |
| 2009/0327661 A1* | 12/2009 | Sperber et al. ............... 712/217 |
| 2010/0199045 A1 | 8/2010 | Bell et al. |
| 2010/0205402 A1 | 8/2010 | Henry |
| 2010/0205415 A1 | 8/2010 | Henry |
| 2011/0264862 A1 | 10/2011 | Karlsson et al. |
| 2012/0023359 A1 | 1/2012 | Edmeades et al. |
| 2012/0089819 A1* | 4/2012 | Chaudhry ............. G06F 9/3838 712/214 |
| 2013/0124829 A1 | 5/2013 | Chou et al. |
| 2014/0082291 A1 | 3/2014 | Van Zoeren et al. |
| 2014/0122805 A1 | 5/2014 | Ekman et al. |
| 2014/0136891 A1 | 5/2014 | Holmer et al. |
| 2014/0164736 A1 | 6/2014 | Rozas |
| 2014/0164738 A1 | 6/2014 | Ekman et al. |
| 2014/0281259 A1 | 9/2014 | Klaiber et al. |
| 2015/0026443 A1 | 1/2015 | Kumar et al. |
| 2017/0199778 A1 | 7/2017 | Ekman et al. |

FOREIGN PATENT DOCUMENTS

| | | |
|---|---|---|
| CN | 1831757 | 9/2006 |
| CN | 102184127 | 9/2011 |
| CN | 103793205 | 5/2014 |
| DE | 102013218370 | 3/2014 |
| EP | 0671718 | 9/1995 |
| GB | 2287111 | 9/1995 |
| TW | 200405201 | 4/2004 |
| TW | 200529071 | 9/2005 |
| TW | 1263938 | 10/2006 |
| TW | 1275938 | 3/2007 |
| TW | 200723111 | 6/2007 |
| TW | 200809514 | 2/2008 |
| TW | I315488 | 10/2009 |
| TW | 201032627 | 9/2010 |
| TW | 201112254 | 4/2011 |
| TW | I425418 | 2/2014 |
| TW | 1536167 | 6/2016 |

OTHER PUBLICATIONS

Mutlu, Onur et al., "Runahead Execution: An Alternative to Very Large Instruction Windows for Out-of-order Processors," This paper appears in: "High-Performance Computer Architecture," Feb. 8-12, 2003, 13 pages.

Chaudry, S. et al., "High-Performance Throughput Computing," Micro, IEEE 25.3, pp. 32-45, May 2005, 14 pages.

Rozas, Guillemo J. et al., "Queued Instruction Re-Dispatch After Runhead," U.S. Appl. No. 13/730,407, filed Dec. 28, 2012, 36 pages.

Adve, S. et al., "Shared Memory Consistency models: A Turorial", WRL Research Report 95/7, Western Digital Laboratory, Sep. 1995, 32 pages.

Dehnert, et al., The Transmeta Code Morphing Software: using speculation, recovery, and adaptive retranslation to address real-life challenges, Mar. 23, 2003, IEEE, CGO '03 Proceedings of the international symposium on Code generation and optimization: feedback-directed and runtime optimization, pp. 15-24.

Ekman, M. et al., "Instruction Categorization for Runahead Operation", U.S. Appl. No. 13/708,544, filed Dec. 7, 2012, 32 Pages.

Ekman, M. et al., "Selective Poisoning of Data During Runahead", U.S. Appl. No. 13/662,171, filed Oct. 26, 2012, 33 Pages.

Holmer, B., et al., "Managing Potentially Invalid Results During Runahead", U.S. Appl. No. 13/677,085, filed Nov. 14, 2012, 29 pages.

Intel Itanium Architecture Software Developer's Manual, Intel, http://www.intel.com/design/itanium/manuals/iasdmanual.htm, 1 page.

Nvidia Corp. Akquirierung spekulativer Genehmigung jur gemeinsam genutzten Speicher, Mar. 20, 2014, SW102013218370 A1, German Patent Office, All Pages.

Rozas, J. et al., "Lazy Runahead Operation for a Microprocessor", U.S. Appl. No. 13/708,645, filed Dec. 7, 2012, 32 pages.

Wikipedia article, "Instruction Prefetch," https://en.wikipedia.org/wiki/Instruction_prefetch, downloaded May 23, 2016.

Wikipedia article, "x86," https://en.wikipedia.org/wiki/X86, downloaded May 23, 2016.

Altera-"Implementing a Queue Manager in Traffic Management Systems", Feb. 2004, "pp. 1-8".

\* cited by examiner

POINTER KEY:
D      DE-ALLOCATION POINTER
R      READ POINTER
RY    REPLAY POINTER
A      ALLOCATION POINTER
B      BOUNDARY POINTER

FIG. 5

CHECKPOINTED BUFFER FOR RE-ENTRY FROM RUNAHEAD

BACKGROUND

Instructions in microprocessors are often re-dispatched for execution one or more times due to pipeline errors or data hazards. For example, an instruction may need to be re-dispatched where an instruction refers to a result that has not yet been calculated or retrieved. Because it is not known whether an unpredicted pipeline stall will arise during execution of the instruction, execution of the instruction may lead to runahead operation configured to detect other misses while the initial miss is being resolved.

DETAILED DESCRIPTION

In modern microprocessors, architectural-level instructions are often divided into micro-operations for execution in a pipeline. Such micro-operations may be dispatched individually or as bundles of micro-operations to various execution mechanisms in the microprocessor. When one or more micro-operations are dispatched, it is not known whether execution of a micro-operation will complete or not. Put another way, it is not known whether a miss or an exception will arise during execution of a micro-operation. In some examples, if a micro-operation does not complete, the micro-operation may be re-executed after the unexpected stall is resolved. Because other misses may arise, it is possible that a micro-operation may be re-executed several times prior to completion of the micro-operation.

A common pipeline execution stall that may arise during execution of a bundle is a load operation that results in a cache miss. Such cache misses may trigger an entrance into a runahead mode of operation (hereafter referred to as "runahead") configured to detect other cache misses, instruction translation lookaside buffer misses, branch mispredicts, or the like, while the initial load miss is being resolved. As used herein, runahead describes virtually any suitable speculative execution scheme resulting from a long-latency event, such as a cache miss where the resulting load event pulls the missing instruction or data from a slower access memory location. Once the initial load miss is resolved, the microprocessor exits runahead and the instruction is re-executed. However, re-fetching the instruction from the instruction or unified cache may slow processor operation. Accordingly, various embodiments are disclosed herein that are related to re-dispatching an instruction selected for re-execution from a buffer upon a microprocessor re-entering a particular execution location after runahead. In one example, a microprocessor is provided. The example microprocessor includes fetch logic, one or more execution mechanisms for executing a retrieved instruction provided by the fetch logic, and scheduler logic for scheduling the instruction for execution. The example scheduler logic includes a buffer for storing the retrieved instruction and one or more additional instructions, the scheduler logic being configured, upon the microprocessor re-entering at a particular execution location after runahead, to re-dispatch, from the buffer, an instruction that has been previously dispatched to one of the execution mechanisms.

Figure 1:
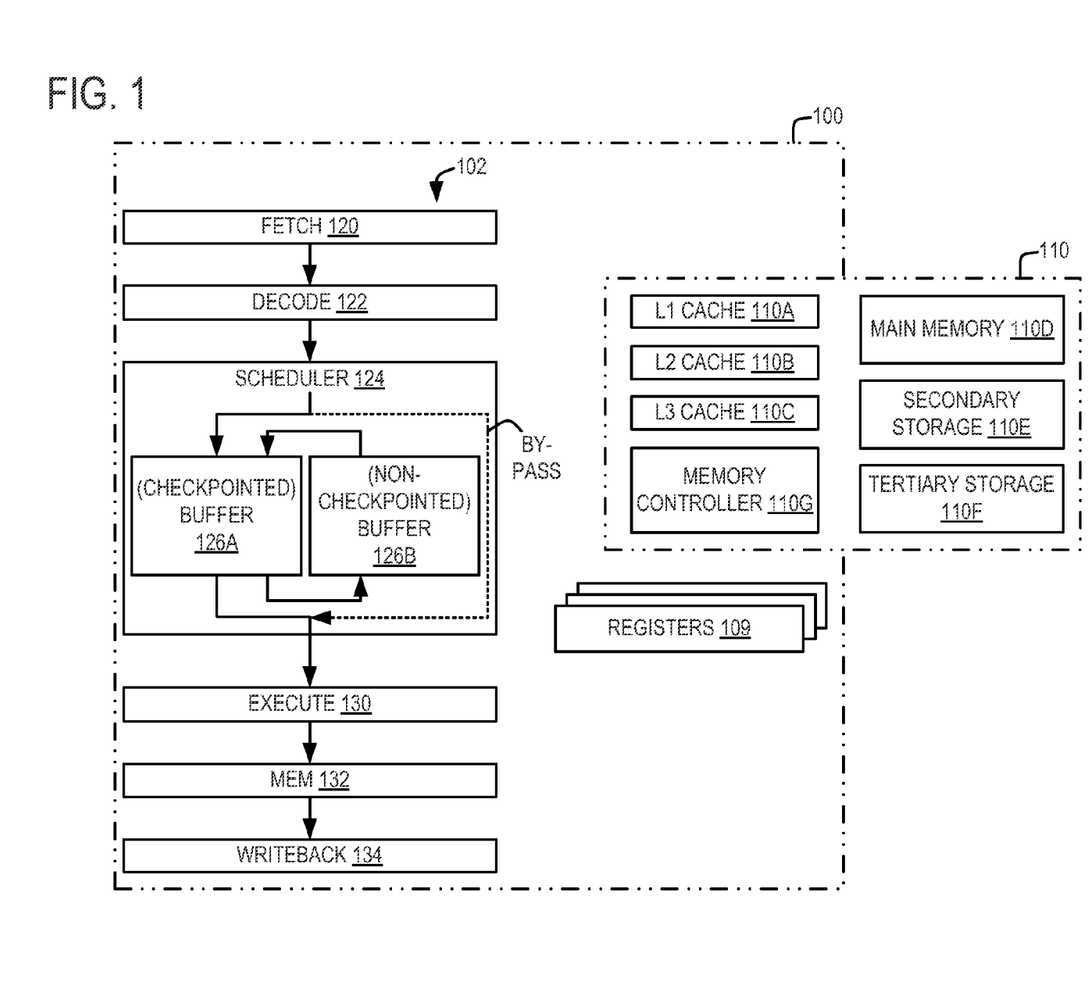
FIG. 1 schematically shows a microprocessor of a computing device according to an embodiment of the present disclosure.

FIG. 1 schematically depicts an embodiment of a microprocessor 100 that may be employed in connection with the systems and methods described herein. Microprocessor 100 variously includes processor registers 109 and may also include a memory hierarchy 110, which may include an L1 processor cache 110A, an L2 processor cache 110B, an L3 processor cache 110C, main memory 110D (e.g., one or more DRAM chips), secondary storage 110E (e.g., magnetic and/or optical storage units) and/or tertiary storage 110F (e.g., a tape farm). It will be understood that the example memory/storage components are listed in increasing order of access time and capacity, though there are possible exceptions.

A memory controller 110G may be used to handle the protocol and provide the signal interface required of main memory 110D and to schedule memory accesses. The memory controller can be implemented on the processor die or on a separate die. It is to be understood that the memory hierarchy provided above is non-limiting and other memory hierarchies may be used without departing from the scope of this disclosure.

Microprocessor 100 also includes a pipeline, illustrated in simplified form in FIG. 1 as pipeline 102. Pipelining may allow more than one instruction to be in different stages of retrieval and execution concurrently. Put another way, a set of instructions may be passed through various execution mechanisms included in pipeline 102 while another instruction and/or data is retrieved from memory. Thus, the execution mechanisms may be utilized while upstream retrieval mechanisms are waiting for memory to return instructions and/or data, engaging various structures such as caches and branch predictors so that other cache misses and/or branch mispredicts may potentially be discovered. This approach may potentially accelerate instruction and data processing by the microprocessor relative to approaches that retrieve and execute instructions and/or data in an individual, serial manner.

As shown in FIG. 1, pipeline 102 includes fetch logic 120, decode logic 122, scheduler logic 124, execution logic 130, mem logic 132, and writeback logic 134. Fetch logic 120 retrieves instructions from the memory hierarchy 110, typically from either unified or dedicated L1 caches backed by L2-L3 caches and main memory. Decode logic 122 decodes the instructions, for example by parsing opcodes, operands, and addressing modes. Upon being parsed, the instructions are then scheduled by scheduler logic 124 for execution by execution logic 130.

Scheduler logic 124 includes a buffer 126, comprising checkpointed buffer 126A and non-checkpointed buffer 126B, for storing one or more instructions. As instructions enter scheduler logic 124, they are queued in buffer 126. The instructions are held in buffer 126 even after the instructions are dispatched to execution logic 130. Thus, it may be possible to re-dispatch previously dispatched instructions from the buffer in response to pipeline discontinuities that cause an instruction to fail to complete after dispatch, such as a load that misses in a data cache. Such re-dispatch may thereby be performed without re-fetching the instructions from outside of the buffer. An instruction may thus be re-dispatched or "re-played" one or more times until it is determined that the instruction achieves a completed state, at which time the instruction may be logically and/or physically removed from the buffer.

As shown in FIG. 1, in some instances, such as during runahead conditions described in more detail below, buffer 126 may be checkpointed to preserve the state of buffer 126 during runahead while a non-checkpointed working state version of buffer 126 queues instruction for dispatch. FIG. 1 also shows an optional bypass configured to forward instructions to execution logic 130 concurrent with storage of the instruction in buffer 126.

In some embodiments, buffer 126 may be configured to store instructions in the form of instruction set architecture (ISA) instructions. Additionally or alternatively, in some embodiments, buffer 126 may be configured to store bundles of micro-operations, each micro-operation corresponding to one or more ISA instructions or parts of ISA instructions. It will be appreciated that virtually any suitable arrangement for storing instructions in bundles of micro-operations may be employed without departing from the scope of the present disclosure. For example, in some embodiments, a single instruction may be stored in a plurality of bundles of micro-operations, while in some embodiments a single instruction may be stored as a bundle of micro-operations. In yet other embodiments, a plurality of instructions may be stored as a bundle of micro-operations. In still other embodiments, buffer 126 may store individual instructions or micro-operations, e.g., instructions or micro-operations that do not comprise bundles at all.

In order for the boundary pointer to point to a valid location upon entry to runahead, buffer 126 is configured to be at least as large as a number of bundles included from a particular bundle causing entry to runahead to a last bundle in the same instruction as that particular bundle, which may be referred to as a tail size for an instruction. Thus, in embodiments where bundles of micro-operations are stored in buffer 126, buffer 126 may be sized according to a pre-determined tail size for micro-operations associated with an architectural instruction. Such ISA instructions and/or bundles may be re-dispatched to execution logic 130 any suitable number of times.

Pipeline 102 also includes mem logic 132 for performing load and/or store operations and writeback logic 134 for writing the result of operations to an appropriate location such as register 109. It should be understood that the above stages shown in pipeline 102 are illustrative of a typical RISC implementation, and are not meant to be limiting. For example, in some embodiments, the fetch logic and the scheduler logic functionality may be provided upstream of a pipeline, such as compiling VLIW instructions or code-morphing. In some other embodiments, the scheduler logic may be included in the fetch logic and/or the decode logic of the microprocessor. More generally a microprocessor may include fetch, decode, and execution logic, each of which may comprise one or more stages, with mem and write back functionality being carried out by the execution logic. The present disclosure is equally applicable to these and other microprocessor implementations, including hybrid implementations that may use VLIW instructions and/or other logic instructions.

In the described examples, instructions may be fetched and executed one at a time, possibly requiring multiple clock cycles. During this time, significant parts of the data path may be unused. In addition to or instead of single instruction fetching, pre-fetch methods may be used to improve performance and avoid latency bottlenecks associated with read and store operations (i.e., the reading of instructions and loading such instructions into processor registers and/or execution queues). Accordingly, it will be appreciated that virtually any suitable manner of fetching, scheduling, and dispatching instructions may be used without departing from the scope of the present disclosure.

Figure 2:
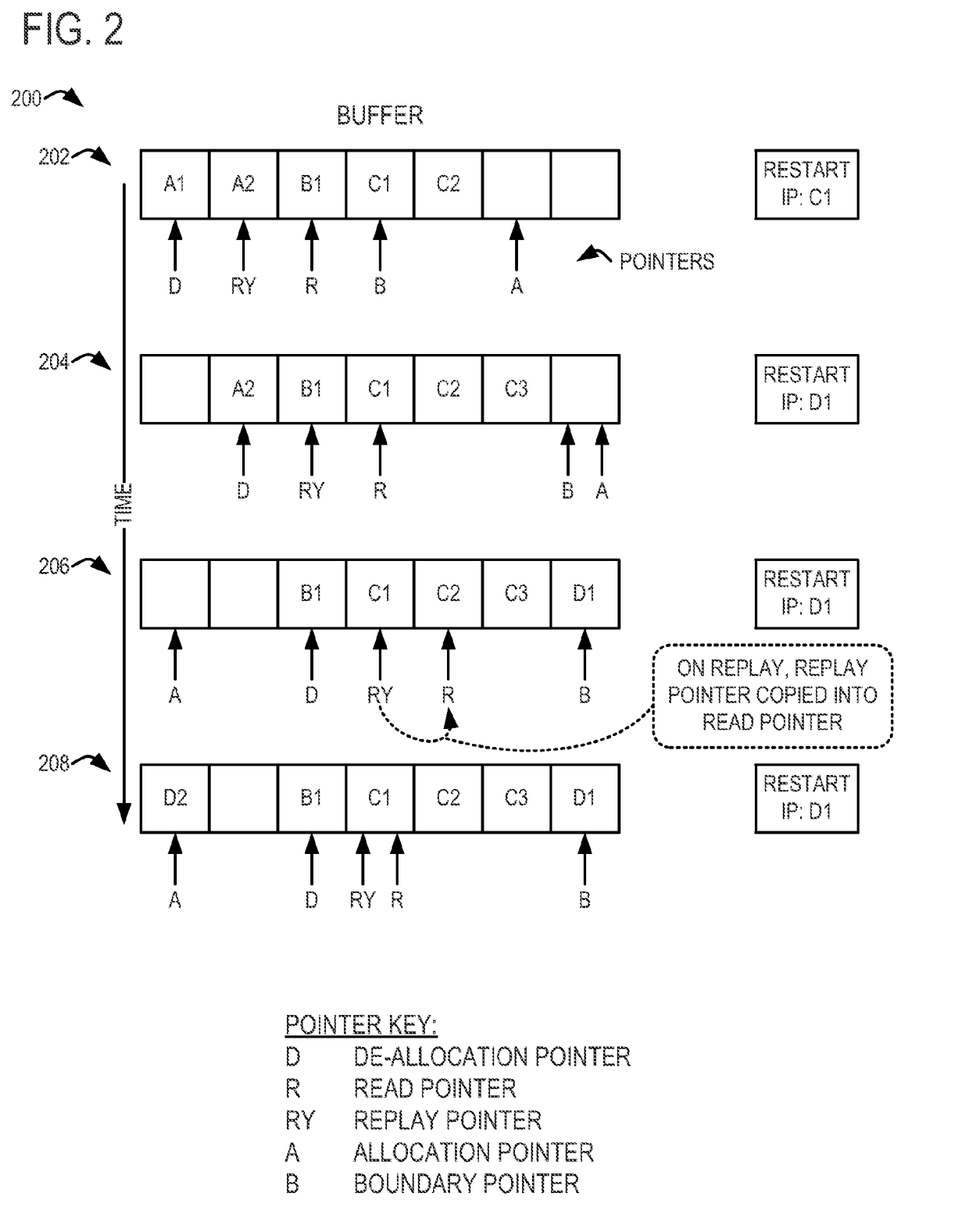
FIG. 2 shows a method of re-dispatching an instruction from a buffer according to an embodiment of the present disclosure.

FIG. 2 schematically shows an embodiment of a method 200 for re-dispatching an instruction stored in a buffer using a plurality of pointers for tracking addresses of instructions stored in the buffer for a working state version (e.g., a non-checkpointed version) of the buffer at four sequential times time 202, time 204, time 206, and time 208. The method depicted in FIG. 2 is provided for illustrative purposes and is not intended to be limiting, as virtually any suitable variation from the method described below may be included in some embodiments without departing from the scope of the present disclosure.

In the example shown in FIG. 2, five bundles A1, A2, B1, C1, and C2 are stored in the buffer at time 202. Bundles A1 and A2 correspond to an architectural instruction A, bundle B1 corresponds to an architectural instruction B, and bundles C1 and C2 correspond to an architectural instruction C. All bundles associated with instruction C are not fully inserted into the buffer at time 202, as a last bundle (C3) has not yet been inserted into the buffer at time 202.

As shown in FIG. 2, pointer "A" references an allocation pointer that indicates where the next bundle is to be inserted into the buffer. Virtually any suitable scheme may be employed for scheduling instructions into and out of the buffer; the buffer shown in FIG. 2 is depicted as a logically first-in, logically first-out circular buffer. The allocation pointer is updated when an instruction (or portion thereof) is inserted into the buffer. In the example shown in FIG. 2, the allocation pointer is updated between time 202 and time 204 as a bundle C3 corresponding to instruction C is inserted into the buffer and again between time 204 and time 206 as a bundle D1 and D2 at time 208 corresponding to instruction D is inserted into the buffer. Note that any of the architectural instruction may be ISA instructions without departing from the scope of the present disclosure.

Pointer "R" references a read pointer that indicates a buffer address or a buffer location of an instruction entry selected to be read in preparation for dispatch to the execution mechanism. For example, the read pointer may point to an address for the selected instruction so that various dependencies of the selected instruction may be read prior to dispatch of the instruction. The read pointer is updated when the selected instruction (or portion thereof) is issued to the execution mechanism. In the example shown in FIG. 2, the read pointer is updated between time 202 and time 204 as bundle B1 corresponding to instruction B is read for dispatch and again as bundle C1 corresponding to instruction C is read for dispatch.

Pointer "D" references a de-allocation pointer that indicates a buffer address or a buffer location of an instruction entry that has completed and is ready to be logically, and in some embodiments, physically removed from the buffer. Thus, the de-allocation pointer points to an instruction that is the next instruction to be removed from the buffer, by being overwritten and/or deleted, for example. Thus, an instruction that is inserted into the buffer by the allocation pointer and is read by the read pointer will remain in the buffer until being indicated for removal by the de-allocation pointer. The de-allocation pointer is updated when the selected instruction (or portion thereof) completes. In the example shown in FIG. 2, the de-allocation pointer is updated between time 202 and time 204 as bundle A1 corresponding to instruction A is readied for de-allocation and between time 204 and time 206 as bundle A2 is readied for de-allocation.

In some embodiments, the de-allocation pointer may be advanced by moving from bundle to bundle (e.g., from A1 to A2), as the bundles may be dispatched and de-allocated from the buffer on a bundle-by-bundle basis. However, in some embodiments, the de-allocation pointer may be advanced by moving from instruction to instruction, even if the buffer stores bundles. For example, the de-allocation pointer may be advanced from A1 to B1, skipping A2, even as the bundles are dispatched individually (e.g., A1, A2, B1, etc.). Accordingly, incremental advancement of the de-allocation pointer and one or more of the other pointers, such as the read pointer, may be different during a working state of the buffer in some embodiments.

It will be appreciated that though the sequence of the A, R, and D pointers is constrained in the order encountered by an instruction (e.g., in the order A, R, and D), any suitable number of buffer positions may separate the A, R, and D pointers, and further, other suitable buffer pointers may intervene as described below.

Pointer "RY" references a replay pointer that indicates a buffer address or a buffer location of an instruction that is to be re-dispatched for re-execution. The replay pointer is updated along with the de-allocation pointer, as once an instruction (or portion thereof) has completed, replay of that instruction is no longer an issue. In the embodiment shown in FIG. 2, the replay pointer trails the read pointer so that an instruction previously read and dispatched may be replayed in the event of a suitable pipeline execution stall. Upon replay, the replay pointer is copied into the read pointer so that the read pointer will read the instruction for which replay is selected. In the example shown in FIG. 2, the replay pointer is copied into the read pointer at time 206 so that the read pointer and the replay pointer both point to bundle C1 at time 208. Thus, the read pointer will point to bundle C1 in preparation for re-dispatching that bundle for re-execution.

In the example shown in FIG. 2 at time 208, the read pointer is depicted as being ready to read bundle C1 in preparation for re-dispatch and re-execution. If bundle C1 does not complete due to some pipeline execution stall, the replay pointer may be copied into the read pointer to cause bundle C1 to be re-dispatched again until the bundle completes successfully. Once the bundle completes, the replay pointer will be advanced and the de-allocation pointer will indicate that bundle C1 is ready to be logically removed from the buffer.

In some embodiments, re-dispatch or replay of an instruction from the buffer may result from exit of the microprocessor from a runahead state. Continuing with the example shown in FIG. 1, for example, a cache miss at L3 cache 110C may trigger a request for an instruction from main memory 110D that may have a comparatively slower fulfillment time relative to a miss at L2 cache 110B and a hit at L3 cache 110C. Once the miss is recognized, the microprocessor is checkpointed so that the microprocessor may return to the checkpointed state after runahead ends (e.g., once the load miss is fulfilled). Thus, if a particular instruction starts runahead, that instruction will complete as a runahead instruction and then be re-dispatched again after runahead ends.

Because it is unknown when runahead will be entered, and the buffer checkpointed, FIG. 2 also depicts a restart instruction pointer configured to track an address or a location following a last complete instruction, e.g., an address for an instruction that follows an instruction having all of its constituent portions loaded into the buffer. Because the buffer will be reset to a state that does not include any incomplete instruction on restart, directing the restart instruction pointer to point to the address for the incomplete instruction will cause the bundles for the incomplete instruction to be loaded from the appropriate location in the memory if a restart is in order. As introduced above, an instruction that will be executed after a last complete instruction held in the buffer may be fetched from outside of the buffer while the instructions held in the buffer are re-dispatched. In some embodiments, the restart instruction pointer may direct an instruction pointer for the fetch logic to fetch another instruction from outside of the buffer while instructions within the buffer are re-dispatched for re-execution. The restart instruction pointer is updated each time a complete instruction is inserted into the buffer. In FIG. 2, the restart instruction pointer points to the instruction pointer of instruction C1 at time 202. At time 204, the restart instruction pointer is updated to point to an instruction beyond C, as instruction C is completed via the insertion of bundle C3. As shown at time 204 in FIG. 2, once bundle C3 is inserted, the restart instruction pointer is depicted as pointing to D1. Thus, in embodiments where an instruction comprises a plurality of bundles of micro-operations, the restart instruction pointer is updated so that it points to integral instruction boundaries and not to positions within an individual instruction.

In some embodiments where the buffer stores ISA instructions, tracking the address or the location of the last complete instruction in the buffer may be comparatively simple because each ISA instruction may have an instruction pointer associated with it. In some other embodiments, such as in embodiments where bundles of micro-operations are stored in the buffer, it may be that an instruction pointer associated with an instruction is included in the last bundle alone of a set of bundles forming an instruction. In such embodiments, the restart instruction pointer may be updated when the last bundle for an instruction is inserted into the buffer. Further, because it can be difficult to identify the end of an instruction from bundles of micro-operations stored in the buffer, in such embodiments, a boundary instruction pointer may be used to track a boundary between a bundle that corresponds to the restart instruction pointer and subsequent bundles, e.g., for tracking a boundary between a last complete instruction held in the buffer and a subsequent bundle belonging to an incomplete instruction held in the buffer. In such embodiments, the restart instruction pointer may then track an address or the location of a last complete instruction held in the buffer as tracked by the boundary instruction pointer. In such embodiments, the boundary instruction pointer may be updated concurrently with the restart instruction pointer. In FIG. 2, the boundary instruction pointer 'B' is updated to point to D1 between time 202 and time 204 as instruction C is completed by the insertion of bundle C3.

In the embodiments described herein, the buffer exists in checkpointed and non-checkpointed versions. Thus, returning to the example shown in FIG. 1, the instruction that caused runahead entrance and one or more subsequent instructions is stored in the checkpointed version of the buffer (shown as checkpointed buffer 126A) so that, on exit from runahead, the instruction that caused runahead and those subsequent instructions may be dispatched from the buffer without being fetched from outside of the buffer. For example, in some embodiments, the instruction may be dispatched directly from checkpointed buffer 126A while in some other embodiments, the instruction initially may be copied into a non-checkpointed version of the buffer (shown as non-checkpointed buffer 126B in FIG. 1) and then dispatched from there. Further, in some embodiments, an instruction that will be executed after a last complete instruction held in the buffer may be fetched from outside of the buffer while the instructions held in the buffer are re-dispatched. Accordingly, the embodiments described herein may offer the potential benefit of reducing instruction processing time after runahead by eliminating fetch processes for instructions stored in the buffer and by triggering fetch processes for subsequent instructions for instructions stored outside of the buffer concurrent to re-dispatch operations for instructions stored inside of the buffer.

Figure 3:
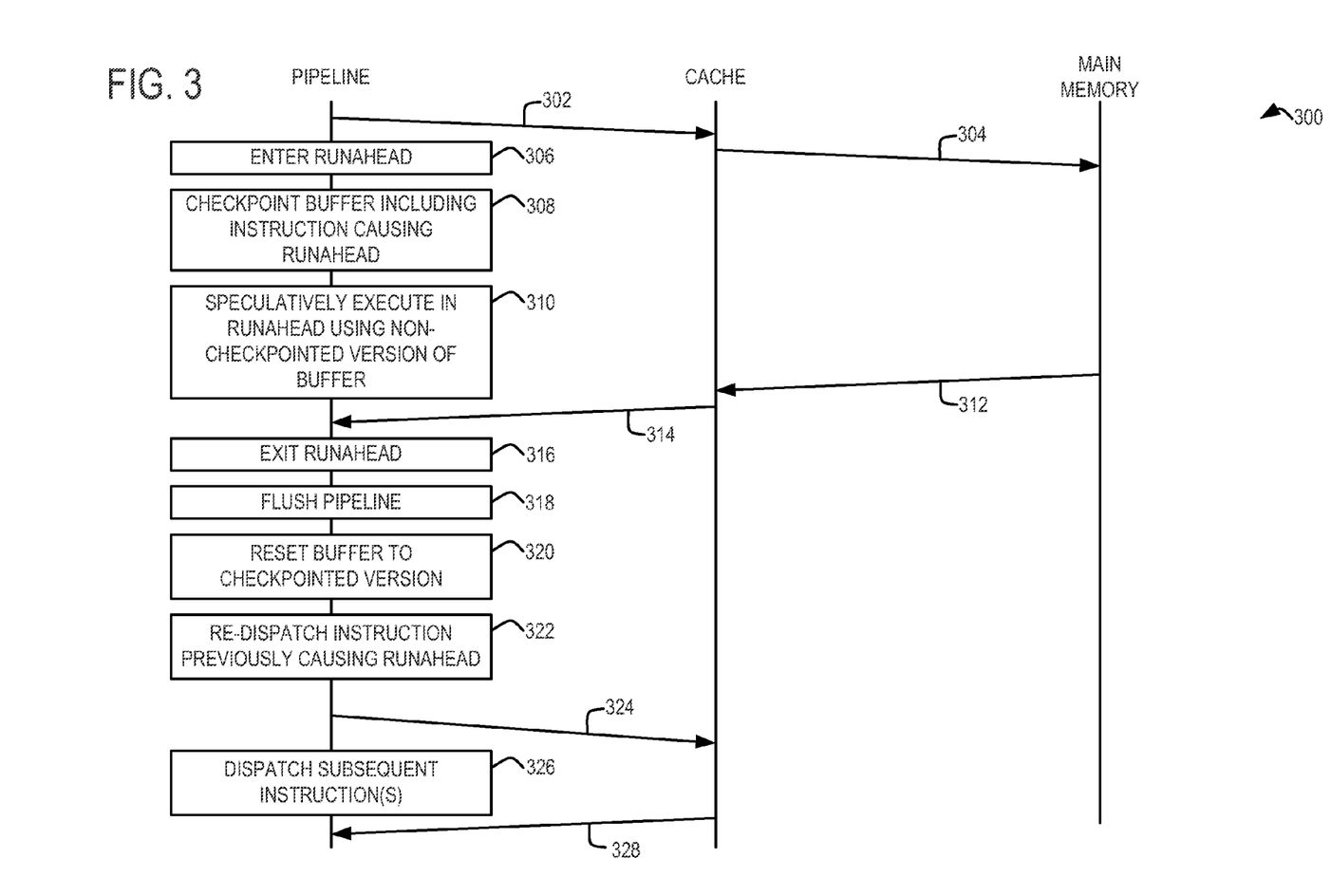
FIG. 3 shows a flowchart illustrating a method of re-dispatching for re-execution an instruction from a buffer after runahead according to an embodiment of the present disclosure.

FIG. 3 shows a flowchart illustrating an embodiment of a method 300 for re-dispatching for re-execution a selected instruction from a buffer after runahead. The description of method 300 provided below is interwoven with references to an example of a buffer provided in FIG. 4. For simplicity, the example shown in FIG. 3 depicts only one level of cache. However, it will be appreciated that any suitable number of cache levels may be employed without departing from the scope of the present disclosure, as may any suitable scheme for reducing miss penalties. Further, the methods depicted in FIGS. 3 and 4 are provided for illustrative purposes and are not intended to be limiting, as almost any suitable variation, including omissions, additions, and re-arrangements from the methods described below may be included in some embodiments without departing from the scope of the present disclosure.

At 302, method 300 includes requesting data by an instruction in execution. In some embodiments, fetch request 302 may be issued by a data pointer in memory logic pointing to an address or a location for the data. For example, when the instruction pointer of the memory logic points to the address for the data, the memory logic is directed to that address to retrieve that particular data. In the example shown in FIG. 3, the fetch request results in a miss, so that, at 304, the cache requests the requested data from main memory.

While the requested data is being retrieved from main memory, method 300 proceeds to 306 where the pipeline enters runahead and, at 308, checkpoints the buffer including the instruction causing entry into runahead. Checkpointing the buffer preserves the state of the buffer (in checkpointed form) during runahead while a non-checkpointed version of the buffer operates in a working state. The checkpointed version is generated upon entry into runahead by the scheduler logic.

Figure 4:
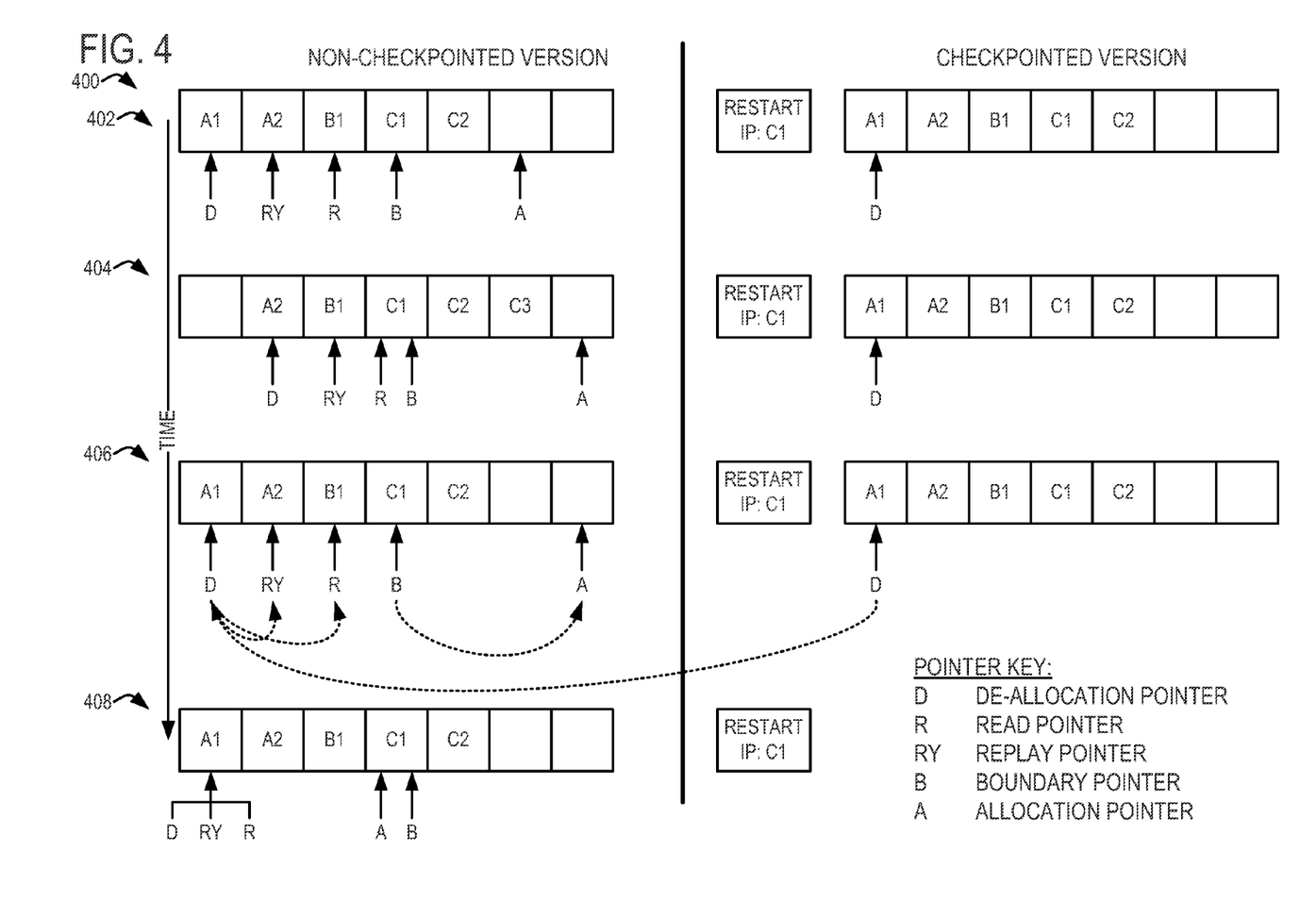
FIG. 4 shows a method of checkpointing and re-dispatching an instruction from a buffer according to an embodiment of the present disclosure.

FIG. 4 schematically shows an embodiment of a method 400 for manipulating a buffer on entry, during, and on exit from an example runahead mode using a plurality of pointers for tracking addresses or locations of instructions stored in the buffer at four sequential times 402, 404, 406, and 408.

In the example shown in FIG. 4, five bundles A1, A2, B1, C1, and C2 are stored in the buffer on entry into runahead at time 402 corresponding to three architectural instructions A, B, and C. All bundles associated with instruction C are not fully inserted into the buffer at time 402, as a last bundle (C3) has not yet been inserted into the buffer at time 402. In the example shown in FIG. 4, the de-allocation pointer 'D' points to a bundle A1 that caused entry into runahead, while read pointer 'R' points to a bundle B1 that is to be dispatched next.

At time 402, method 400 shows the generation of a checkpointed version of the buffer, the checkpointed version including the checkpointed version of the de-allocation pointer. In the checkpointed version of the buffer, the de-allocation pointer and the content of the buffer remain in the checkpointed state awaiting the end of runahead.

The embodiment of the checkpointed version of the buffer shown in FIG. 4 includes a plurality of vacancies. Such vacancies may result from checkpointing the buffer immediately (within an acceptable tolerance) upon entry into runahead. Alternatively, in some other embodiments, the buffer may be checkpointed after runahead commences but not until the buffer reaches a pre-determined occupancy. For example, in some of such embodiments, the buffer may not be checkpointed until the buffer becomes full. So long as the checkpoint is generated prior to exit from runahead, such approaches may store comparatively more instructions relative to the immediate checkpointing approach, potentially reducing the likelihood of a pipeline stall before the fetch logic dispatches instructions again after exit from runahead.

When restarting from runahead, the fetch logic is typically directed to an instruction pointer following the last complete instruction in the buffer. As introduced above, the restart instruction pointer keeps track of an address or a location following the last complete instruction in the buffer. In embodiments where the buffer holds bundles of micro-operations, a boundary pointer may be used to track a boundary between a bundle that corresponds to the restart instruction pointer and subsequent bundles, e.g., for tracking a boundary between a last complete instruction held in the buffer and a subsequent bundle. The embodiment shown in FIG. 4 depicts a restart instruction pointer configured to track an address or a location following a last complete instruction in the buffer, e.g., C1. FIG. 4 also shows a boundary instruction pointer 'B' which also points to bundle C1. As shown in FIG. 4, the boundary instruction pointer is not checkpointed on entry into runahead, but remains frozen in the non-checkpointed version during runahead. This approach may potentially save storage space in the checkpointed buffer.

Continuing with FIG. 3, at 310, method 300 includes speculatively executing in runahead using the non-checkpointed version of the buffer. During runahead, the microprocessor continues to speculatively execute instructions, sometimes imprecisely due to unavailable destination data, so that additional cache misses, translation look-aside buffer misses, and/or branch misprediction events may be identified while the initial miss that triggered the runahead is being fulfilled. Thus, fulfillment of the additional misses and other potentially unpredictable and/or possibly long-running stall conditions may be started during fulfillment of the initial miss request, potentially saving time.

In the embodiment shown in FIG. 4, as time progresses from time 402 to time 404, the read, replay, allocation, and de-allocation pointers included in the non-checkpointed version of the buffer move as the microprocessor moves through speculative execution. For example, in the non-checkpointed version of the buffer, bundle C3 is inserted into the buffer and bundle A1 is de-allocated from the buffer at time 404, the read and replay pointers advance, and so on.

Meanwhile, at 312 and 314, the missing data responsible for causing entry runahead is provided to the pipeline, resolving the load miss and causing runahead to end at 316.

Once the initial load miss is fulfilled, the pipeline is flushed at 318, which may include discarding one or more invalid results of the speculative execution performed during runahead and, in some embodiments, the non-checkpointed version of the buffer so that the microprocessor is in the same state in which it existed when runahead commenced.

At 320, method 300 includes resetting the buffer to the checkpointed version of the buffer so that the buffer is set to the state from when the microprocessor entered runahead. Resetting the buffer to the checkpointed version at 320 includes restoring the de-allocation pointer from the checkpointed version of the buffer.

In the embodiment shown in FIG. 4, resetting the buffer to the checkpointed state is depicted at time 406, which includes copying the checkpointed version of the de-allocation pointer from the checkpointed buffer to the non-checkpointed buffer. In the example shown in FIG. 4, at 406, the de-allocation pointer is copied to the non-checkpointed version of the de-allocation pointer and to the replay and read pointers while the boundary pointer is unfrozen and copied into the allocation pointer position. Further, the restart instruction pointer points to the address associated with B, the last complete instruction present in the buffer. Meanwhile, the de-allocation, read, and replay pointers point to the bundle associated with bundle A1, so that A1 may be re-dispatched to the execution unit. Finally, the allocation pointer points to the location after instruction B. After restoration of the buffer after runahead, bundles C1 and C2 logically will not be present in the buffer. Accordingly, positioning the allocation pointer to point the location following the last complete instruction (instruction B in the example shown in FIG. 4) provides that all of the bundles associated with the incomplete instruction (instruction C in FIG. 4) may be fetched on restoration of the buffer after runahead. Consequently, in the example shown in FIG. 4, on restart, all of the pointers in the buffer may be determined based on the de-allocation pointer and the boundary pointer.

Continuing with FIG. 3, at 322, method 300 includes re-dispatching the instruction that previously caused runahead. Re-dispatching the instruction includes reading the instruction selected for re-execution upon the microprocessor re-entering a particular execution location after runahead, and after reading the selected instruction, re-dispatching the instruction to one or more execution mechanisms of the microprocessor. Once the instruction has been re-executed and has completed, the instruction is logically removed from the buffer as indicated by the de-allocation pointer.

In the example shown in FIG. 4, the read pointer is depicted as being ready to read bundle A1 in preparation for re-dispatch and re-execution. If bundle A1 does not complete due to some pipeline execution stall, the replay pointer may be copied into the read pointer to cause bundle A1 to be re-dispatched again until the bundle completes successfully. Once the bundle completes, the replay pointer will be advanced and the dispatch pointer will indicate that bundle A1 is ready to be logically removed from the buffer.

Continuing with FIG. 3, at 324, method 300 includes fetching another instruction from outside the buffer while the selected instruction is re-dispatched. At 326, a subsequent instruction from inside of the buffer may be dispatched for execution (for example, instruction B1 as shown in FIG. 4) while, at 328 the instruction from outside of the buffer is returned from the cache.

It will be appreciated that the checkpointing schemes described above are provided for illustrative purposes only, and that virtually any suitable approach to checkpointing the buffer may be employed without departing from the scope of the present disclosure. For example, in one scenario, the buffer may be checkpointed along with the boundary, de-allocation, and allocation pointers at entry into runahead. At exit from runahead, the buffer may be restored by copying the checkpointed versions of the boundary, de-allocation, and allocation pointers from the checkpointed versions thereof, where the de-allocation pointer is also copied into the read and replay pointers so that the read, replay, and de-allocation pointers point to a common address.

It will be appreciated that methods described herein are provided for illustrative purposes only and are not intended to be limiting. Accordingly, it will be appreciated that in some embodiments the methods described herein may include additional or alternative processes, while in some embodiments, the methods described herein may include some processes that may be reordered or omitted without departing from the scope of the present disclosure. Further, it will be appreciated that the methods described herein may be performed using any suitable hardware including the hardware described herein.

Figure 5:
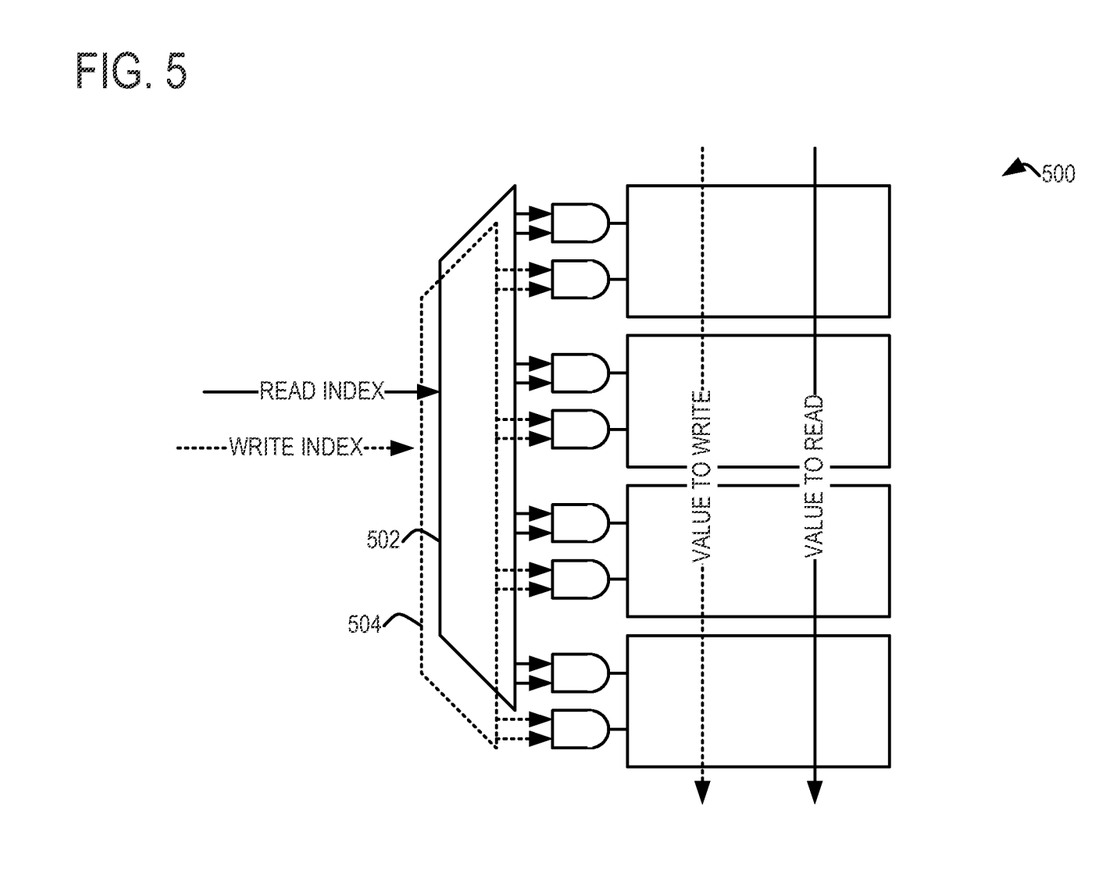
FIG. 5 schematically shows a plurality of storage cells for a buffer according to an embodiment of the present disclosure.

FIG. 5 schematically shows an example storage cell 500 for a buffer according to an embodiment of the present disclosure. In the embodiment shown in FIG. 5, the buffer is stored in storage cell 500 using 2N entries arranged in pairs. Read decoder 502 and write decoder 504, when given an address X, may decode to different entries or to the same entry, depending on whether one entry is the checkpointed entry (and thus may not be overwritten during runahead) and depending on whether the entry has already been written in the non-checkpointed subset. In some of such embodiments, the scheduler logic may include an address bit configured to identify whether a selected address for a selected entry in storage cell 500 corresponds to a checkpointed version of the buffer or a non-checkpointed version of the buffer. The address may be used to identify whether information is to be stored or accessed in a working version or in a checkpointed version of the buffer. Storage cell 500 may be virtually any suitable storage cell. For example, in some embodiments, storage cell 500 may include SRAM.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples as understood by those of ordinary skill in the art. Such other examples are intended to be within the scope of the claims.

The invention claimed is:

1. A microprocessor, comprising:
   fetch logic;
   one or more execution mechanisms for executing a retrieved instruction provided by the fetch logic; and
   scheduler logic for scheduling the retrieved instruction for execution, the scheduler logic including a buffer for storing the retrieved instruction and one or more additional instructions,
   the scheduler logic further comprising:
      a checkpointed version of the buffer comprising an instruction causing entry into runahead and a plurality of subsequent instructions; and
      a non-checkpointed version of the buffer operating in a working state to speculatively execute an unlimited number of instructions during runahead;
   wherein, after runahead, the scheduler logic is configured to reset the buffer to the checkpointed version, wherein the scheduler logic is configured, upon the microprocessor re-entering at a particular execution location after runahead, to re-dispatch, from the buffer, an instruction that has been previously dispatched to one of the execution mechanisms.

2. The microprocessor of claim 1, wherein the buffer is stored in a single array comprising 2N entries of the retrieved instructions arranged in pairs.

3. The microprocessor of claim 2, wherein the scheduler logic comprises an address bit configured to identify whether a selected address for a selected entry in storage cells corresponds to a checkpointed version of the buffer or a non-checkpointed version of the buffer.

4. The microprocessor of claim 1, wherein the buffer comprises:
 a read pointer for reading a selected instruction held in the buffer in preparation for dispatching the selected instruction for execution; and
 a de-allocation pointer for causing the selected instruction to be logically removed from the buffer after the selected instruction completes.

5. The microprocessor of claim 4, wherein the buffer further comprises:
 a replay pointer for causing a selected instruction to be re-dispatched for re-execution during replay; and
 a restart instruction pointer for tracking an address following a last complete instruction held in the buffer, the restart instruction pointer directing an instruction pointer for the fetch logic wherein the fetch logic fetches another instruction from outside of the buffer while the selected instruction is re-dispatched for re-execution.

6. The microprocessor of claim 1, wherein the buffer is configured to store a plurality of bundles of micro-operations, each micro-operation corresponding to one or more instruction set architecture (ISA) instructions or parts of ISA instructions, wherein the scheduler logic further comprises a boundary instruction pointer for tracking a boundary between a last bundle for a complete ISA instruction held in the buffer and a subsequent bundle belonging to an incomplete ISA instruction held in the buffer, and wherein the restart instruction pointer is configured to track an address following a last complete instruction held in the buffer as tracked by the boundary instruction pointer.

7. The microprocessor of claim 1, wherein the checkpointed version is generated by the scheduler logic upon entry into runahead.

8. The microprocessor of claim 7, wherein the checkpointed version comprises one or more vacancies.

9. The microprocessor of claim 1, wherein the fetch logic and the scheduler logic are upstream of a pipeline of the microprocessor.

10. The microprocessor of claim 1, wherein the scheduler logic is included in the fetch logic and/or decode logic for decoding an instruction for execution at one of the execution mechanisms of the microprocessor.

11. A method for re-dispatching an instruction to be re-executed at a microprocessor, the method comprising:
 entering a runahead condition;
 generating a checkpointed version of a buffer, wherein the checkpointed version comprises an instruction causing entry into runahead and a plurality of subsequent instructions;
 reading an instruction selected for re-execution upon the microprocessor re-entering a particular execution location after returning from the runahead condition, the instruction held in the buffer during the runahead condition for re-dispatch to one or more execution mechanisms of the microprocessor,
 wherein said buffer is within scheduler logic of the microprocessor;
 after returning from the runahead condition, re-dispatching the instruction; and
 from outside of the buffer, fetching another instruction while the selected instruction is re-executed.

12. The method of claim 11, further comprising, after runahead and before reading the instruction held in the buffer, resetting a non-checkpointed version of the buffer to the checkpointed version.

13. The method of claim 12, wherein the resetting the non-checkpointed version of the buffer to the checkpointed version comprises:
 copying a checkpointed version of a de-allocation pointer to a read pointer, the de-allocation pointer configured to cause the instruction to be logically removed from the buffer after the selected instruction completes, wherein the read pointer is configured to read the instruction in preparation for execution; and
 copying the checkpointed version of the de-allocation pointer to a replay pointer, the replay pointer configured to cause a selected instruction to be re-dispatched for re-execution during replay.

14. The method of claim 13, wherein the re-dispatching the instruction comprises: reading the instruction as indicated by the read pointer dispatching the instruction to the one or more execution mechanisms; and
 logically removing the instruction from the buffer upon completion as indicated by the de-allocation pointer.

15. The method of claim 14, wherein the re-dispatching the instruction further comprises replaying the instruction as indicated by the replay pointer responsive to an execution stall.

16. The method of claim 14, wherein the fetching another instruction from outside the buffer comprises copying a restart instruction pointer to an instruction pointer for fetch logic of the microprocessor wherein the fetch logic fetches the other instruction from outside of the buffer while the instruction is re-executed, wherein further the restart instruction pointer is configured to track an address following a last complete instruction held in the buffer.

17. The method of claim 16, wherein the buffer is configured to store a plurality of bundles of micro-operations, each micro-operation corresponding to one or more ISA instructions or parts of ISA instructions, wherein the restart instruction pointer is configured to track an address following a last complete instruction held in the buffer with reference to a boundary instruction pointer configured to track a boundary between a last bundle for a complete ISA instruction held in the buffer and a subsequent bundle belonging to an incomplete ISA instruction held in the buffer, and wherein the fetching another instruction from outside the buffer comprises tracking a boundary between a last bundle for a complete ISA instruction held in the buffer and a subsequent bundle belonging to an incomplete ISA instruction held in the buffer with the boundary instruction pointer.

18. A microprocessor configured to break an ISA instruction into a plurality of micro-instructions for execution, the microprocessor comprising:
 scheduler logic comprising:
  a buffer for storing a plurality of bundles of micro-operations in a checkpointed state during runahead, each micro-operation corresponding to one or more ISA instructions held in the buffer for dispatch to an execution mechanism of the microprocessor for execution upon re-entering after runahead, at least one of the ISA instructions having been previously dispatched to the execution mechanism;

a boundary instruction pointer for tracking a boundary between a last bundle for a last complete ISA instruction held in the buffer and a subsequent bundle belonging to an incomplete ISA instruction held in the buffer; and a restart instruction pointer for tracking an address following a last complete instruction held in the buffer, wherein the restart instruction pointer directing an instruction pointer for fetch logic wherein the fetch logic fetches another instruction from outside of the buffer while the one or more ISA instructions held in the buffer are re-dispatched for re-execution.

* * * * *